DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED FEBRUARY 2, 1971

883 O.G. 12

T883,017

PHOTOGRAPHIC SILVER HALIDE MATERIALS CONTAINING CYANINE DYES AS CHEMICAL SENSITIZERS

Cynthia Geer Ulbing, Kodak Park Works, 1669 Lake Ave., Rochester, N.Y. 14650

Filed June 29, 1970, Ser. No. 51,021
**Int. Cl. G03c *1/28***
U.S. Cl. 96—107
No Drawing. 20 Pages Specification

Low concentrations of certain quaterned trinuclear complex cyanine I, trinuclear complex merocyanine II and quaternated tetranuclear complex cyanine dyes III chemically sensitize fine grain silver halide photographic emulsions having an average grain size less than about 0.3 micron. The effect is obtained with concentrations of the dyes well below the effective spectral sensitizing concentrations, e.g., of the order of 0.1 to 25 mg. of dye per mole of silver halide. Examples of the dyes include:

I

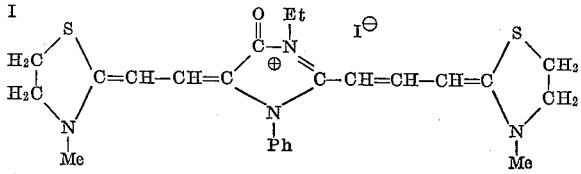

II

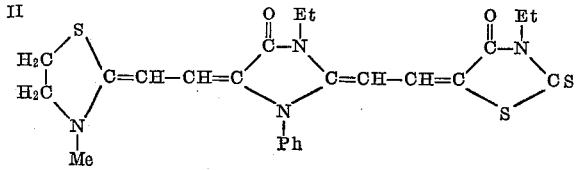

and

III

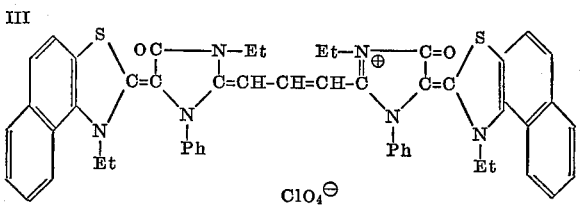

When I, II or III is added in amounts of 1.0 mg./mole Ag to a fine grain (0.2$\mu$) cubic silver bromoiodide gelatin emulsion which is gold and sulfur sensitized and the emulsion is coated on cellulose acetate film support at 400 mg. Ag/ft.$^2$ and 400 mg. gelatin/ft.$^2$, an increase in blue speed without substantial spectral sensitization is observed.